US008564364B2

(12) United States Patent
Marinet et al.

(10) Patent No.: US 8,564,364 B2
(45) Date of Patent: Oct. 22, 2013

(54) COUNTERMEASURE METHOD AND DEVICE FOR PROTECTING AGAINST A FAULT INJECTION ATTACK BY DETECTION OF A WELL VOLTAGE CROSSING A THRESHOLD

(75) Inventors: Fabrice Marinet, Chateauneuf le Rouge (FR); Mathieu Lisart, Aix en Provence (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 141 days.

(21) Appl. No.: 13/071,325

(22) Filed: Mar. 24, 2011

(65) Prior Publication Data

US 2011/0234307 A1    Sep. 29, 2011

(30) Foreign Application Priority Data

Mar. 24, 2010   (FR) ...................................... 10 01176
Mar. 24, 2010   (FR) ...................................... 10 01177

(51) Int. Cl.
*H01L 27/00*   (2006.01)
*G05F 3/08*    (2006.01)

(52) U.S. Cl.
USPC ............................ 327/565; 327/534; 327/538

(58) Field of Classification Search
None
See application file for complete search history.

(56) References Cited

U.S. PATENT DOCUMENTS

| 6,320,770 | B1 | 11/2001 | Feuser |
| 6,419,159 | B1 | 7/2002 | Odinak |
| 6,745,331 | B1 | 6/2004 | Silverbrook |
| 6,867,637 | B2 * | 3/2005 | Miyazaki et al. ............. 327/534 |
| 6,967,522 | B2 * | 11/2005 | Chandrakasan et al. ...... 327/534 |
| 7,002,397 | B2 * | 2/2006 | Kubo et al. .................... 327/534 |
| 8,116,050 | B2 * | 2/2012 | Nagasawa et al. ............. 361/57 |
| 2003/0133241 | A1 | 7/2003 | Feuser et al. |
| 2004/0025135 | A1 | 2/2004 | Hart et al. |
| 2004/0143747 | A1 | 7/2004 | Eckstein et al. |
| 2006/0156039 | A1 | 7/2006 | Deveaud et al. |
| 2007/0126100 | A1 | 6/2007 | Mizuno et al. |
| 2007/0171588 | A1 | 7/2007 | Gehle et al. |
| 2009/0174031 | A1 | 7/2009 | Wang et al. |
| 2009/0251168 | A1 | 10/2009 | Lisart et al. |

OTHER PUBLICATIONS

Bar-El, H. et al., "The Sorcerer's Apprentice Guide to Fault Attacks," Proceedings of the IEEE 94(2):370-382, Feb. 2006.

* cited by examiner

*Primary Examiner* — Lincoln Donovan
*Assistant Examiner* — Terry L Englund
(74) *Attorney, Agent, or Firm* — Seed IP Law Group PLLC

(57) ABSTRACT

A method for detecting an attack in an electronic microcircuit comprises: forming the microcircuit in a substrate, forming in the substrate a first well electrically isolated from the substrate, by a second well and an embedded well, forming in the first and second wells a data processing circuit comprising a ground terminal formed in the first well and a power supply terminal formed in the second well, and activating a detection signal when a voltage at the ground or power supply terminal of the data processing circuit crosses a threshold voltage.

23 Claims, 3 Drawing Sheets

COUNTERMEASURE METHOD AND DEVICE FOR PROTECTING AGAINST A FAULT INJECTION ATTACK BY DETECTION OF A WELL VOLTAGE CROSSING A THRESHOLD

BACKGROUND

1. Technical Field

The present disclosure relates to a countermeasure method for protecting sensitive data circulating in an electronic microcircuit, against attacks which aim is to discover these data. It also relates to a microcircuit portable device such as a chip card, implementing the method.

2. Description of the Related Art

Sensitive data may be in particular encryption or decryption keys, and more generally cryptographic data used or elaborated during cryptographic calculations, such as intermediate data of such calculations, and identifiers desired to be kept secret.

Microcircuit devices using sensitive data are sometimes subjected to attacks which aim is to determine these data. Among the known attacks, the attacks of SPA (Simple Power Analysis) or DPA (Differential Power Analysis) type consist in taking numerous current and voltage measures coming in and going out of the microcircuit during a program execution or data processing by the microcircuit, with different input data. The measures obtained are used by a statistical analysis to deduce therefrom protected data, processed or used by the microcircuit. For the same aim, the attacks of EMA (Electromagnetic Analysis) and DEMA (Differential Electromagnetic Analysis) type are based on the analysis of the electromagnetic radiation emitted by the microcircuit.

Attacks by fault injection are also known, which consist in introducing disturbances into the microcircuit when it executes for example sensitive algorithms such as cryptographic algorithms, or which aim is to trigger the execution of a downloading routine emitting on a port the data it memorizes. Such disturbance may be made by applying to the microcircuit one or more brief flashes for example by a laser beam, or one or more voltage peaks to one of the contacts thereof.

So as to fight against these attacks, which are various by nature, numerous solutions, very different from one another, have been brought. The disclosure more particularly relates those which aim is to detect attacks by fault injection.

Various detection techniques have been implemented so as to fight against these attacks. Thus, it is known to duplicate in a microcircuit the circuits to be protected, and to compare the data supplied by the duplicated circuits. If a difference appears in the data supplied, it means that the microcircuit has been subjected to an attack by fault injection. This detection technique reveals to be demanding in terms of circuit size and electrical consumption.

It is also known to insert into a microcircuit several local detectors reacting to a lighting flash by supplying an active detection signal. This solution does not really allow sensitive circuits of the microcircuit to be protected from a fault injection, unless a great number of local detectors are provided, which induce a significant additional cost in terms of circuit size and electrical consumption.

BRIEF SUMMARY

One embodiment is a countermeasure device for protecting circuits handling secret data against attacks by fault injection. One embodiment is able to detect a fault injection in particular by applying brief flashes or voltage peaks to the microcircuit. One embodiment is a countermeasure device that does not substantially increase the complexity or electrical consumption or the microcircuit.

Some embodiments relates to a method for detecting an attack in an electronic microcircuit, comprising: forming the microcircuit in a substrate, forming in the substrate a first well electrically isolated from the substrate, by a second well and an embedded well, and forming in the first and second wells a data processing circuit comprising a ground terminal formed in the first well and a power supply terminal formed in the second well. According to one embodiment, the method comprises activating a detection signal when a voltage at the ground or power supply terminal of the data processing circuit crosses a threshold voltage.

According to one embodiment, the detection signal is activated as soon as the voltage between the ground terminal and a ground of the substrate crosses the threshold voltage.

According to one embodiment, the threshold voltage is adjusted at a value higher than a variation range of the ground voltage at the ground terminal of the data processing circuit in normal operation, taking into account a ground bias voltage in relation to the ground of the substrate.

According to one embodiment, the detection signal is activated as soon as the voltage between the power supply terminal and a ground of the substrate goes below the threshold voltage.

According to one embodiment, the threshold voltage is adjusted at a value lower than a variation range of the power supply voltage of the data processing circuit in normal operation.

According to one embodiment, the ground terminal of the data processing circuit is linked to the ground terminal of the substrate through a resistor or a bias circuit supplying a bias voltage to the ground terminal of the data processing circuit.

According to one embodiment, the method comprises forming several data processing circuits in the substrate, each data processing circuit being formed in a first well, and in a second well electrically isolating from the substrate the first well with an embedded well, each data processing circuit comprising a ground terminal formed in the first well and a power supply terminal formed in the second well, and forming a detection circuit for each data processing circuit, each detection circuit supplying an active detection signal when a voltage at the ground or power supply terminal of the data processing circuit crosses a threshold voltage.

According to one embodiment, the method comprises forming for each data processing circuit of a bias circuit supplying a bias voltage to the ground terminal of the data processing circuit.

According to one embodiment, the method comprises supplying an active consolidated detection signal if at least one of the detection signals is active.

Some embodiments also relate to a microcircuit comprising a data processing circuit, comprising power supply and ground terminals, the ground terminal being formed in a first well electrically isolated from the substrate, by a second well and an embedded well According to one embodiment, the processing circuit is associated to a detection circuit to activate a detection signal when a voltage at the ground or power supply terminal of the data processing circuit crosses a threshold voltage, the microcircuit being configured to implement the method such as previously defined.

According to one embodiment, the ground terminal of the data processing circuit is linked to the ground terminal of the substrate through a resistor or a bias circuit supplying a bias voltage to the ground terminal to the data processing circuit.

According to one embodiment, the microcircuit comprises several data processing circuits, each comprising power supply and ground terminals, each ground terminal being formed in an isolated well, each processing circuit being associated to a detection circuit supplying an active detection signal when a voltage at the ground or power supply terminal of the data processing circuit crosses a threshold voltage.

According to one embodiment, the microcircuit comprises a logic circuit receiving all the detection signals, and supplying an active consolidated detection signal if at least one of the detection signals is active.

According to one embodiment, the microcircuit comprises for each data processing circuit a bias circuit supplying a bias voltage to the ground terminal of the data processing circuit.

Some embodiments also relate to a microcircuit portable device comprising a microcircuit such as previously defined.

BRIEF DESCRIPTION OF THE SEVERAL VIEWS OF THE DRAWINGS

Embodiments of the disclosure will be described hereinafter, in relation with, but not limited to the appended figures wherein.

DETAILED DESCRIPTION

Figure 1:
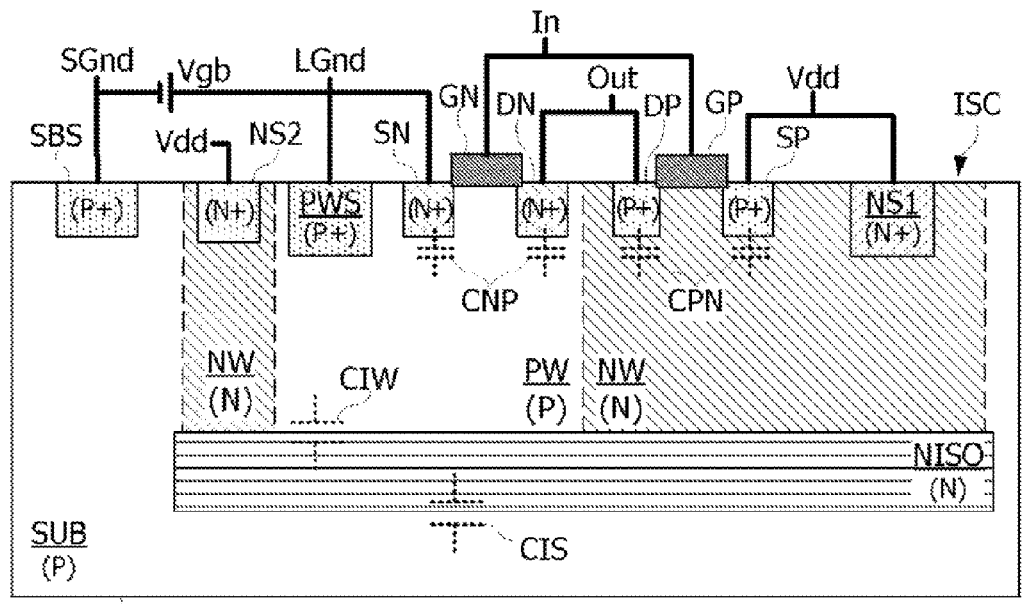
FIG. 1 schematically shows a cross-section of a substrate in which an integrated circuit is formed.

FIG. 1 shows an integrated circuit IC comprising a substrate SUB in a semiconductor material of P-type conductivity in which a circuit ISC is formed. The substrate SUB comprises a P+ doped region SBS forming a substrate connection connected to a substrate ground SGnd. The circuit ISC comprises an embedded region NISO of N-type conductivity and a well NW of N-type conductivity formed in the substrate until reaching the region NISO. The well NW is formed so as to encircle an area of the substrate thus forming a well PW of P-type conductivity. The well PW is thus isolated from a main portion of the substrate SUB by the region NISO and well NW. The region NISO forms with the well PW a capacitance CIW, and with the main portion of the substrate SUB a capacitance CIS. The presence of the capacitances CIW, CIS allows the noise on the ground SGnd of the substrate SUB and the electromagnetic radiation emitted by the circuit to be reduced, in particular in the band from 800 MHz to 1 GHz.

The well NW comprises N+ doped regions NS1, NS2 forming well connections intended to receive the power supply voltage Vdd of the circuit. The well NW also comprises P+ doped regions DP, SP forming the drain and the source of a P-channel CMOS transistor comprising a gate GP formed above an area forming the transistor channel, between the source SP and drain DP regions. The well PW comprises a P+ doped region PWS forming a well connection intended to be connected to the ground and two N+ doped regions SN, DN forming the source and the drain of a N-channel CMOS transistor comprising a gate GN formed above an area between the source SN and drain DN regions. Each of the gates GP, GN comprise a conductive layer overlying a thin dielectric layer on the substrate. The areas between a P+ doped region and a N+ doped region comprise a trench filled in with an isolating material (not shown), formed in the substrate to isolate the P+ doped regions from the N+ doped regions. The drain DN, DP and source SN, SP regions of the transistors, form with the wells NW and PW capacitances CPN, CNP. In the example of FIG. 1, the N-channel and P-channel transistors are interconnected so as to form an inverter. Thus, the source SP receives the power supply voltage Vdd, and the source SN is connected to the ground connection PWS. An input In of the inverter is connected to the gates SN and SP, and an output Out of the inverter is connected to the drains DN, DP.

The ground connection PWS of the well PW forms a local ground LGnd of the circuit ISC which may be connected to the ground of the substrate SGnd, or receive a bias voltage in relation thereto.

Figure 2:
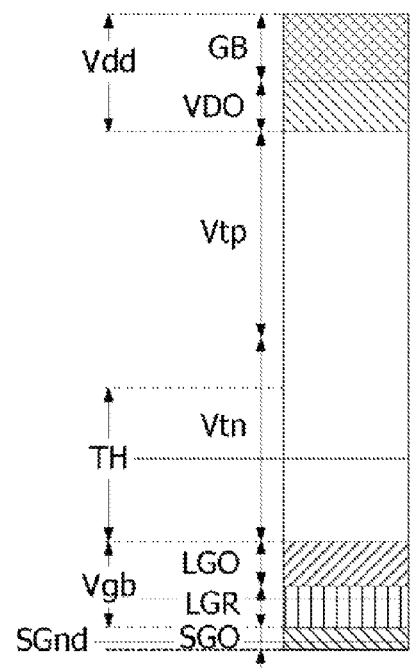
FIG. 2 shows on a scale different voltage levels to be considered in an analysis of the integrated circuit operation.

FIG. 2 shows on a scale different voltage values and ranges to be considered in the integrated circuit IC operation. The scale of FIG. 2 comprises, from the top of the scale, voltage ranges GB, VDO, LGO, LGR then SGO at the bottom of the scale. The voltage range GB delineates the variations of the power supply voltage Vdd resulting from variations of the integrated circuit performances linked to variations of the ambient temperature and variations of the manufacturing conditions of the integrated circuit. The voltage range VDO delineates the variations of the voltage Vdd as a function of the extent of the integrated circuit activity. The range VDO corresponds to the drop of the voltage Vdd in the internal resistors of the integrated circuit. The range LGO delineates the variations of the bias voltage of the local ground of the circuit ISC as a function of the extent of the integrated circuit IC activity. The range LGR delineates the maximum adjusting extent of the voltage Vgb of the local ground of the circuit ISC. The range SGO delineates the variations of the voltage of the substrate SUB ground as a function of the extent of the integrated circuit IC activity.

The extent of the range LGR may be chosen so that the voltage difference between the ranges VDO and LGO is superior or equal to the sum of the minimum voltages making it possible to guarantee the switching of the N-channel and P-channel transistors of the integrated circuit IC, i.e. the sum of the threshold voltages Vtn of a N-channel transistor and Vtp of a P-channel transistor, to which an overdrive of around 10% is added.

The maximum extent of the adjusting range of the voltage Vgb of the local ground LGnd may be chosen so as to take into account different voltages relative to the integrated circuit IC operation and features. Thus, the maximum extent of the adjusting range of the bias voltage Vgb may be chosen so as to comply with the threshold voltages of a N-channel transistor and a P-channel transistor of the integrated circuit IC, with the power supply voltage Vdd and with the voltage drops which occur in the circuits of the integrated circuit when they are active. The voltages taken into account are considered with an error margin linked to performance variations of the integrated circuit resulting from ambient temperature variations or process corners of the integrated circuit.

In the 90 nm integration technology, the rated power supply voltage is of around 1.3 V (with a possible difference of 10%). At the top of the scale of FIG. 2, the ranges GB and VDO have spreads of around 70 mV and 50 mV. The spreads of the threshold voltages Vtp and Vtn are on average of 500 mV and 475 mV. A voltage range of around 1025 mV should therefore be provided to allow the N-channel and P-channel transistors of the circuit ISC to switch. The ranges LGO and SGO have spreads of 50 mV and 25 mV. Therefore there is around 50 mV (with a possible difference of 10%) for the adjusting range LGR of the voltage Vgb. In the 0.18 μm integration technology, the adjusting range of the voltage Vgb may have an extent of 100 to 200 mV.

Figure 3A:
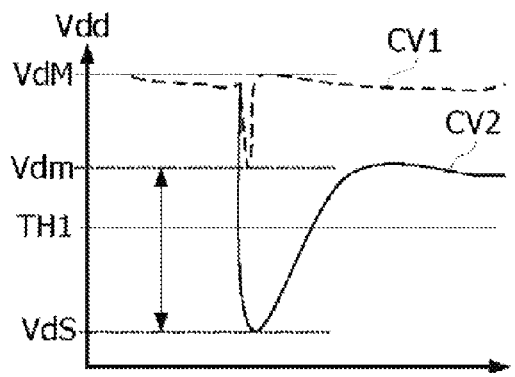
FIGS. 3A and 3B are variation curves as a function of time, of voltages in the integrated circuit when it is subjected to a brief flash.
Figure 3B:
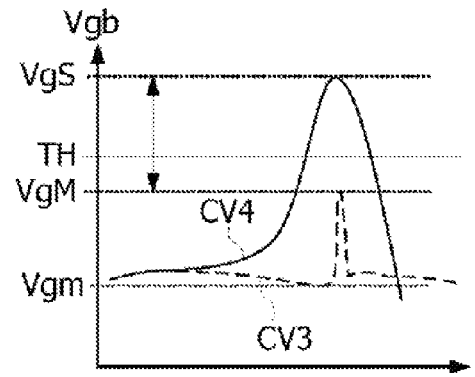

FIGS. 3A, 3B show variation curves as a function of time of the power supply voltage Vdd (curves CV1, CV2) and the voltage Vgb of the local ground LGnd (curves CV3, CV4). In normal operation, the voltage Vdd (curve CV1) varies between a maximum value when the circuit ISC is inactive and a minimum value Vdm. The voltage area between the voltages Vdm and VdM corresponds to the range VDO in FIG. 2. In normal operation, the voltage Vgb (curve CV3) varies between a minimum value Vgm when the circuit ISC is inactive and a maximum value VgM when the circuit is active. The voltage area between the voltages Vgm and VgM corresponds to the range LGO in FIG. 2.

In the event of overvoltage for example caused by a lighting flash such as a laser shot on the circuit ISC or by a voltage peak applied to a contact pad of the circuit, a high current appears between the power supply source Vdd and the local ground LGnd of the circuit ISC. This high current results from the fact that parasitic bipolar transistors tend to initiate a latch-up. On the other hand, the presence of the embedded region NISO minimizes the effect of other parasitic bipolar transistors, preventing a high current from establishing between the local ground LGnd of the circuit ISC and the ground of the substrate SGnd. Consequently, little current passes between the power supply source Vdd and the ground of the substrate SGnd. The curves CV2 and CV4 show the effect of the high current on the power supply Vdd and local ground Vgb voltages. In the curve CV2, the voltage Vdd drops significantly down to a voltage VdS (more than twice the width of the range VDO). In the curve CV4, the voltage Vgb increases rapidly until reaching a relatively high voltage peak VgS (more than twice the width of the range LGO).

Figure 4:
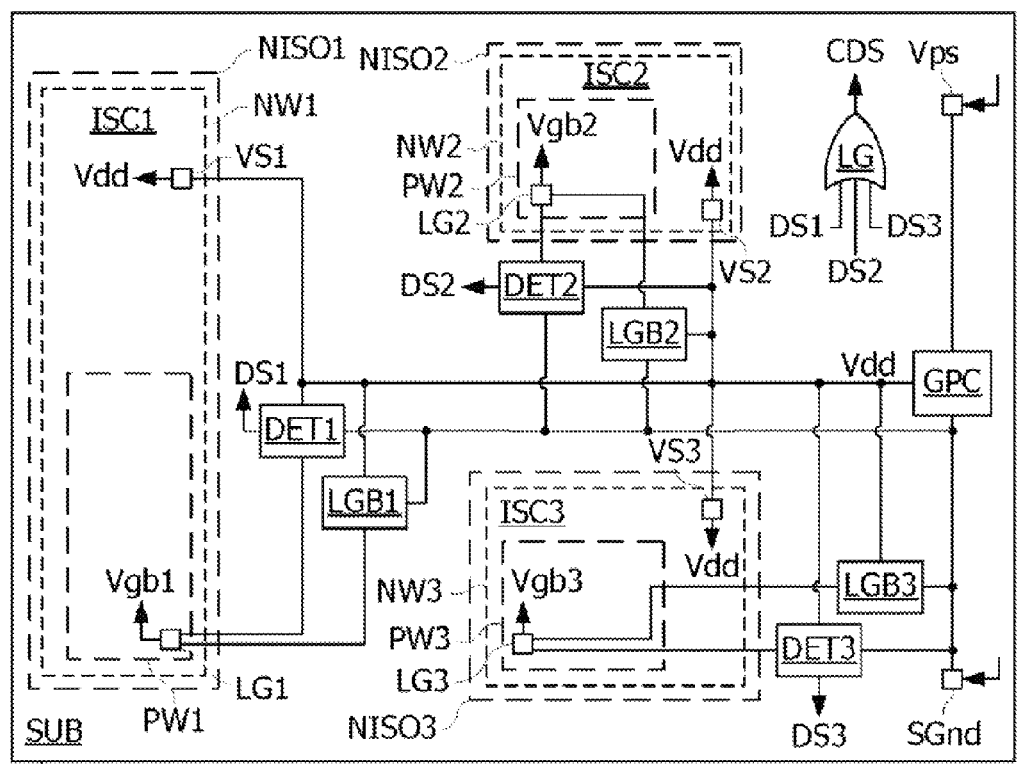
FIG. 4 is a schematic top view of the integrated circuit, according to one embodiment, FIG. 5 schematically shows a power supply circuit of the integrated circuit, FIG. 6 schematically shows a bias circuit of a local ground of a circuit of the integrated circuit.

FIG. 4 shows the integrated circuit IC, according to one embodiment. In FIG. 4, the integrated circuit IC comprises several circuits formed in the substrate SUB, including several circuits ISC1, ISC2, ISC3 to be protected by a countermeasure device. The integrated circuit IC comprises a global power supply circuit GPC supplying to the various circuits of the integrated circuit, including the circuits ISC1, ISC2, ISC3, the power supply voltage Vdd in relation to the ground of the substrate SGnd, from an external power supply voltage Vps.

According to one embodiment, each of the circuits ISC1, ISC2, ISC3 comprises a well of P-type conductivity PW1, PW2, PW3 encircled by a well of N-type conductivity NW1, NW2, NW3, and isolated from the rest of the substrate SUB by an embedded isolating region NISO1, NISO2, NISO3. Each of the circuits ISC1, ISC2, ISC3 comprises a local ground connection LG1, LG2, LG3 and may be coupled to a bias circuit LGB1, LGB2, LGB3 supplying a voltage Vgb1, Vgb2, Vgb3 of the local ground LG1, LG2, LG3 in relation to the ground of the substrate SGnd. Thus, each circuit ISC1, ISC2, ISC3 may be powered by a power supply voltage equal to Vdd−Vgb<i> (where i is equal to 1, 2 or 3). As each circuit ISC1, ISC2, ISC3 is isolated from the main portion of the substrate, the voltages Vgb1, Vgb2, Vgb3 may be different at a given time when the circuits ISC1, ISC2, ISC3 are all active. The circuits LGB1, LGB2, LGB3 may consist of a simple resistor of some Ohms linking the local ground LG1, LG2, LG3 to the ground of the substrate SGnd.

According to one embodiment, each circuit ISC1, ISC2, ISC3 is coupled to a detection circuit DET1, DET2, DET3 to detect an attack of the circuit by a fault injection and supply an active detection signal DS1, DS2, DS3 in the event of a detection of such an attack. To that end, the detection circuit is configured to detect a voltage peak exceeding a determined threshold TH between the voltages VgM and VgS, in the voltage Vgb of the local ground LGnd, or a drop of the power supply voltage Vdd exceeding a determined threshold TH1 between the voltages VdS and Vdm. In the example of FIG. 4, each detection circuit DET1, DET2, DET3 is connected between the output of the power supply circuit GPC and the ground of the substrate SGnd, and is connected to the local ground terminal LG1, LG2, LG3 of one of the circuits ISC1, ISC2, ISC3. The integrated circuit IC may in addition comprise a logic circuit LG, for example comprising an OR logic gate, receiving all the detection signals DS1, DS2, DS3, and supplying an active consolidated detection signal CDS if at least one of the signals DS1, DS2, DS3 is active, revealing the detection of an attack of the integrated circuit IC by fault injection.

The circuits DET1, DET2, DET3 thus allow a fault injection to be detected on the whole substrate surface occupied by each of the circuits ISC1, ISC2, ISC3, above the wells NISO1, NISO2, NISO3.

Figure 5:
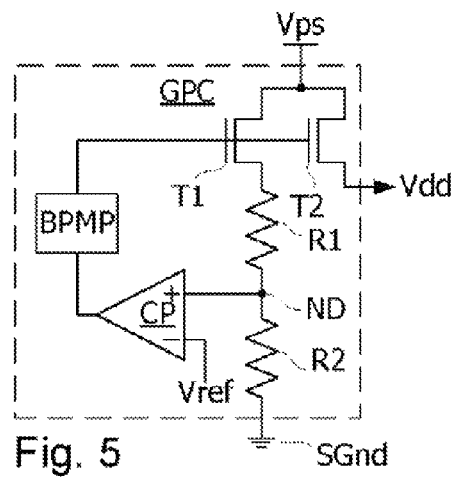

FIG. 5 shows an example of power supply circuit GPC of the integrated circuit IC. The circuit GPC comprises two N-channel MOS transistors T1, T2, two resistors R1, R2, a comparator CP and a step-up voltage circuit BPMP. The drain of the transistors T1, T2 receives the external voltage Vps. The source of the transistor T1 is linked to the substrate ground SGnd through the resistors R1 and R2 connected in series. The junction node ND between the resistors R1, R2 is connected to a direct input of the comparator CP. The comparator CP comprises an inverting input receiving a constant reference voltage Vref, for example fixed at 0.8 V. The output of the comparator is connected to an input of the circuit BPMP. The output of the circuit BPMP is connected to the gates of the transistors T1, T2. The source of the transistor T2 supplies the power supply voltage Vdd. The circuit BPMP for example made by a charge pump, supplies a voltage equal to Vdd+Vtn, where Vtn is the threshold voltage of the transistors T1, T2. The comparator CP regulates the voltage Vdd by keeping the voltage at the node ND substantially equal to the voltage Vref. The value of the voltage Vdd is defined by the values of the resistors R1, R2.

Figure 6:
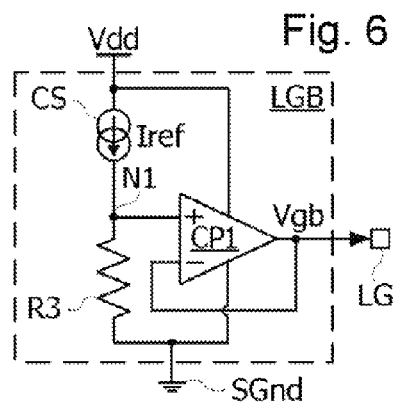

FIG. 6 shows an embodiment of each of the bias circuits LGB1, LGB2, LGB3. In FIG. 6, the circuit LGB comprises a resistor R3, a comparator CP1 and a current source CS. The current source CS is powered by the voltage Vdd and supplies a current Iref equal to a reference voltage Vref divided by a resistor (not shown). The voltage Vref is substantially constant, i.e. in particular independent of the ambient temperature of the integrated circuit IC and the manufacturing conditions thereof. The voltage Vref may be for example supplied by a bandgap reference circuit. The comparator CP1 is powered between the power supply voltage Vdd and the substrate ground SGnd. The resistor R3 is connected in series between the current source CS and the ground. The junction node N1 between the current source and the resistor R3 is connected to a direct input of the comparator CP1. The output of the comparator CP1, which supplies the voltage Vgb to a ground terminal LG (terminal LG1, LG2, LG3 of the circuit ISC1, ISC2, ISC3), is looped to the inverting input thereof. Thus, the comparator CP1 regulates the voltage Vgb by keeping it equal to the voltage at the node N1. The voltage Vgb supplied by the circuit LGB may therefore be calculated using the following equation:

$$Vgb = R3 Iref = Vref R3/R \qquad (1)$$

where R is a resistor such that Vref=Iref R. The circuit LGB has the advantage of not being sensitive to variations of the power supply voltage Vdd which may occur in particular when the integrated circuit IC is active due to voltage drops in the internal resistors of the circuit IC and in the event of attack by fault injection.

The resistor R3 may be adjustable to adjust the local ground voltage Vgb. In the 90 nm technology with the power supply voltage Vdd fixed at 1.3 V, and if Vref is fixed at 0.1 V and if Vgb is adjustable between 1 and 50 mV, then the ratio R3/R of the values of the resistors R3 and R is adjustable between 1/100 and ½. Conventionally, the adjustable resistor R3 may be made using several resistors connected in series, a switch being mounted in parallel of each resistor mounted in series, each switch being controlled by a bit of a control word.

Figure 7:
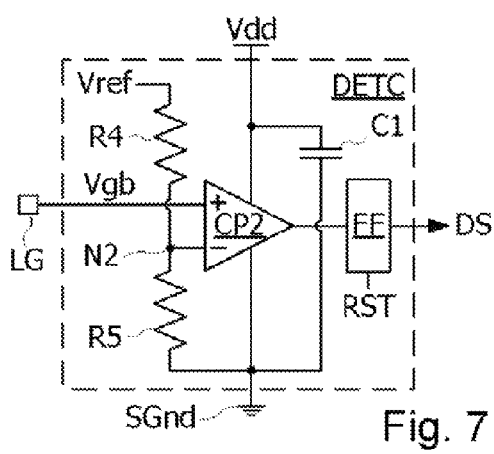
FIG. 7 shows a circuit for detecting fault injection, according to one embodiment.

One embodiment of a detection circuit is shown in FIG. 7. In FIG. 7, the detection circuit DETC comprises two resistors R4, R5 a capacitor C1, a comparator CP2 and a flip-flop FF. The comparator CP2 is powered between the power supply voltage Vdd and the substrate ground SGnd. The capacitor C1 is connected between the source of the voltage Vdd and the ground SGnd to filter or decrease the possible variations of the voltage Vdd. A direct input of the comparator CP2 is connected to the ground terminal LG (terminal LG1, LG2, LG3 of the circuit ISC1, ISC2, ISC3). The resistors R4, R5 are connected in series between a reference voltage source Vref and the ground of the substrate SGnd. The junction node N2 between the two resistors R4, R5 is connected to an inverting input of the comparator CP2. The output of the comparator CP2 is connected to an input of the flip-flop FF which outputs a detection signal DS. The flip-flop FF is for example of RS type to supply a logic signal at 0 as long as the output signal of the comparator is at 0 and a logic signal at 1 as soon as a signal different from zero appears in output of the comparator CP2. The state of the flip-flop FF may be reset at 0 using a reset signal RST supplied to a reset input of the flip-flop. The capacitor C1 has a capacitance sufficient to maintain the voltage Vdd in the event of a voltage drop the sufficient time for the detection.

The circuit DETC supplies a logic signal DS indicating an attack (for example at 1) as soon as a voltage difference appears between the local ground voltage Vgb and the ground of the substrate SGnd, higher than a threshold voltage TH. The threshold voltage TH is defined by the resistors R4, R5 and the reference voltage Vref. Thus, the threshold voltage TH may be determined using the following formula:

$$TH = Vref/(1+R4/R5) \qquad (2)$$

The resistors R4 and R5 may be chosen so that the threshold voltage TH is as low as possible above the voltage VgM or the range LGO (FIGS. 3B and 2) to obtain a high detection sensitivity while avoiding the risk of false detection. One of the two resistors R4, R5, for example the resistor R5 may be adjustable to adjust the threshold voltage TH as a function of the local ground voltage Vgb supplied by the bias circuit LGB to obtain a determined detection sensitivity. FIGS. 2 and 3B indicate an adjusting range of the threshold voltage TH located above the adjusting range LGO of the voltage Vgb and between the voltages VgM and VgS. FIG. 3B shows that a compromise is to be found for the threshold TH1, knowing that by increasing the detection sensitivity, the risk of false detection is increased.

When the signal DS indicates an attack, any adapted measure may be taken, given that indicating an error may reveal an attack of the integrated circuit IC. Thus, the integrated circuit may, in the event of error detection, for example reset, definitely block, erase the memory thereof or only the sensitive data it memorizes, etc.

Figure 8:
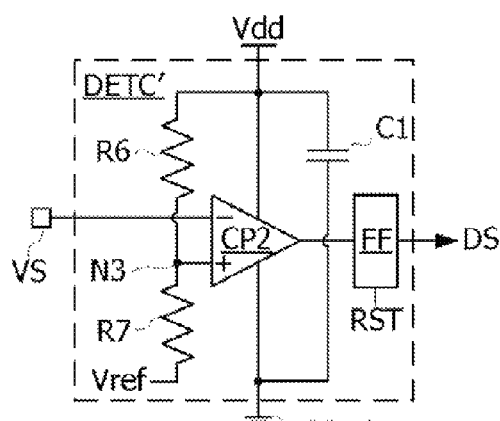
FIG. 8 shows a circuit for detecting fault injection, according to another embodiment.

FIG. 8 shows a detection circuit DETC', according to another embodiment. In FIG. 8, the circuit DETC' differs from the circuit DETC in that it is configured to connect, not to the local ground terminal of the circuit ISC1, ISC2, ISC3, but to the power supply terminal VS (corresponding to VS1, VS2 or VS3 in FIG. 4) thereof. The circuit DETC' differs from the circuit DETC in that the inverting input of the comparator CP2 is connected to the terminal VS and the power supply voltage source Vdd is linked to the voltage source Vref through resistors R6 and R7 connected in series. The junction node N3 between the resistors R6, R7 is connected to the direct input of the comparator CP2.

The circuit DETC' supplies a logic signal DS indicating an attack (for example at 1) as soon as a voltage difference appears between the power supply voltage at the terminal VS and the power supply voltage Vdd at the output of the circuit GPC, lower than a threshold voltage TH1. The threshold voltage TH1 is defined by the resistors R6, R7 and the voltages Vdd and Vref. Thus, the threshold voltage TH1 may be calculated using the following formula:

$$TH1 = Vref + (Vdd - Vref)/(1+R6/R7) \qquad (3)$$

The resistors R6 and R7 may be chosen so that the threshold voltage TH1 is as high as possible below the voltage Vdm or the range VDO (FIGS. 3A and 2) to obtain a high detection sensitivity while avoiding the risk of false detection. One of the two resistors R6, R7, for example the resistor R7 may be adjustable to adjust the threshold voltage TH1 as a function of the power supply voltage Vdd supplied by the power supply circuit GPC to obtain a determined detection sensitivity. FIG. 3B indicates an adjusting range of the threshold voltage TH1 located between the voltages VdS and Vdm. FIG. 3B shows that a compromise is to be found for the threshold TH1, knowing that by increasing the detection sensitivity, the risk of false detection is increased.

Figure 9:
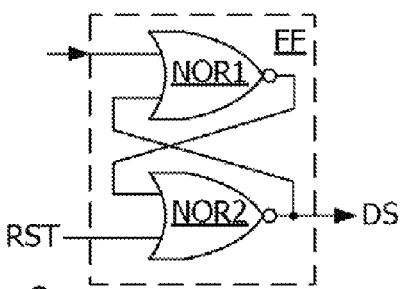
FIG. 9 shows a flip-flop of the detection circuit of FIG. 7 or 8.

FIG. 9 shows a conventional example embodiment of the flip-flop FF. The flip-flop FF comprises two logic gates NOR1, NOR2 of NOR type. The output of each gate NOR1, NOR2 is connected to an input of the other gate. The gate NOR1 comprises an input connected to an input of the flip-flop FF (connected to the output of the comparator CP2) and the gate NOR2 comprises an input receiving a reset signal RST from the flip-flop. The output of the gate NOR2 is linked to the output of the flip-flop.

It will be clear to those skilled in the art that the present disclosure is susceptible of various embodiments and applications. In particular, the disclosure is not limited to an integrated circuit comprising several wells isolated from the main portion of substrate. All the process circuits of the integrated circuit may be formed in one isolated well and one well encircling the isolated well.

The disclosure is not limited either to the circuits described for detecting an attack by lighting flash or voltage peaks applied to contact pads of the integrated circuit. Any other circuit making it possible to detect a voltage peak crossing a threshold voltage in the power supply voltage or the ground voltage (isolated from the substrate) of a processing circuit of the integrated circuit may be adapted.

Figure 10:
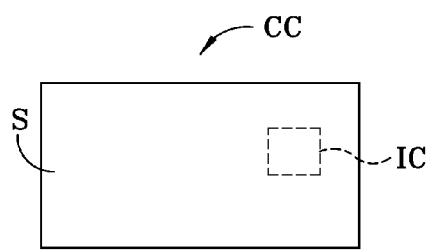
FIG. 10 is a chip card according to one embodiment of the present disclosure.

A microcircuit portable device according to one embodiment is shown in FIG. 10. In particular, the microcircuit portable device is a chip card CC that includes a support S that typically would be made of plastic, as is typical for chip cards. The chip card CC also includes an integrated circuit such as the integrated circuit IC described above. Those skilled in the art will understand that a microcircuit portable device according to the present disclosure can be implemented using any portable device with a processor that is desired to be protected from hacking attempts.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
detecting that a voltage of at least one of a first local ground terminal and a first power supply terminal crosses a first threshold voltage, the first local ground and first power supply terminals being part of a first data processing circuit of a microcircuit in a substrate, the microcircuit including first and second wells and a first embedded region formed in the substrate, the first well being electrically isolated from a main portion of the substrate by the second well and the first embedded region; the first local ground terminal being formed in the first well and the first power supply terminal being formed in the second well;
activating a first detection signal in response to detecting the voltage at the at least one of the first local ground and first power supply terminals of the first data processing circuit crossing the first threshold voltage; and
supplying a bias voltage to the first local ground terminal of the first data processing circuit through a resistor or a bias circuit coupling the first local ground terminal of the first data processing circuit to a ground of the substrate.

2. A method according to claim 1, wherein the activating includes activating the first detection signal in response to the voltage, being a voltage between the first local ground terminal and the ground of the substrate, crossing the first threshold voltage.

3. A method according to claim 1, wherein the activating includes activating the first detection signal in response to the voltage, being a voltage between the first power supply terminal and a ground of the substrate, going below the first threshold voltage.

4. A method according to claim 1, further comprising:
producing a regulated supply voltage by regulating a supply voltage received at a supply terminal of the microcircuit;
supplying the regulated supply voltage to the first power supply terminal, wherein:
the bias voltage is greater than a voltage received at the ground of the substrate;
the detecting includes detecting that a first voltage difference, between the first local ground terminal and the ground of the substrate, crosses the first threshold voltage, or detecting that a second voltage difference, between the first power supply terminal and the regulated supply voltage, crosses the first threshold voltage; and
the activating includes activating the first detection signal in response to detecting the first voltage difference or the second voltage difference crossing the first threshold voltage.

5. A method comprising:
detecting that a voltage of at least one of a first local ground terminal and a first power supply terminal crosses a first threshold voltage, the first local ground and first power supply terminals being part of a first data processing circuit of a microcircuit in a substrate, the microcircuit including first and second wells and a first embedded region formed in the substrate, the first well being electrically isolated from a main portion of the substrate by the second well and the first embedded region; the first local ground terminal being formed in the first well and the first power supply terminal being formed in the second well;
activating a first detection signal in response to detecting the voltage at the at least one of the first local ground and first power supply terminals of the first data processing circuit crossing the first threshold voltage; and
adjusting the first threshold voltage to a value higher than a variation range of a local ground voltage at the first local ground terminal of the first data processing circuit in a normal operation, taking into account a ground bias voltage in relation to the ground of the substrate.

6. A method according to claim 5, wherein the activating includes activating the first detection signal in response to a voltage between the first local ground terminal and the ground of the substrate crossing the first threshold voltage.

7. A method, comprising:
detecting that a voltage of at least one of a first local ground terminal and a first power supply terminal crosses a first threshold voltage, the first local ground and first power supply terminals being part of a first data processing circuit of a microcircuit in a substrate, the microcircuit including first and second wells and a first embedded region formed in the substrate, the first well being electrically isolated from a main portion of the substrate by the second well and the first embedded region; the first local ground terminal being formed in the first well and the first power supply terminal being formed in the second well;
activating a first detection signal in response to detecting the voltage at the at least one of the first local ground and first power supply terminals of the first data processing circuit crossing the first threshold voltage; and
adjusting the first threshold voltage to a value lower than a variation range of the voltage at the first power supply terminal of the first data processing circuit in a normal operation.

8. A method according to claim 7, wherein the activating includes activating the first detection signal in response to the voltage, being a voltage between the first power supply terminal and a ground of the substrate, going below the first threshold voltage.

9. A method
detecting that a voltage of at least one of a first local ground terminal and a first power supply terminal crosses a first threshold voltage, the first local ground and first power supply terminals being part of a first data processing circuit of a microcircuit in a substrate, the microcircuit including first and second wells and a first embedded region formed in the substrate, the first well being electrically isolated from a main portion of the substrate by the second well and the first embedded region; the first local ground terminal being formed in the first well and the first power supply terminal being formed in the second well;

activating a first detection signal in response to detecting the voltage at the at least one of the first local ground and first power supply terminals of the first data processing circuit crossing the first threshold voltage, wherein the detecting and activating are performed using a first detection circuit;

detecting, using a second detection circuit, that a voltage of at least one of a second local ground terminal and a second power supply terminal of a second data processing circuit crosses a second threshold voltage, the second data processing circuit being part of the microcircuit, the microcircuit including third and fourth wells and a second embedded region formed in the substrate, the third well being electrically isolated from the main part of the substrate by the fourth well and the second embedded region, the second local ground terminal being formed in the third well and the second power supply terminal being formed in the fourth well; and activating, using the second detection circuit, a second detection signal in response to detecting that the voltage of the at least one of the second local ground terminal and the second power supply terminal crosses the second threshold voltage.

10. A method according to claim 9, comprising supplying first and second bias voltages to the first and second local ground terminals, respectively, the supplying including supplying the first bias voltage using a first bias circuit and supplying the second bias voltage using a second bias circuit.

11. A method according to claim 9, comprising supplying a consolidated active detection signal if at least one of the first and second detection signals is active.

12. A microcircuit comprising:
a first data processing circuit that includes a first power supply terminal and a first local ground terminal, the first local ground terminal being positioned in a first well of a substrate, the first well being electrically isolated from a main part of the substrate by a second well of the substrate and a first embedded region of the substrate; and
a first detection circuit formed in the substrate, the first detection circuit being configured to activate a detection signal in response to detecting that a voltage of at least one of the first local ground terminal and the first power supply terminal of the first data processing circuit crosses a first threshold voltage;
a ground terminal of the substrate coupled to the first local ground terminal of the first data processing circuit; and
a bias circuit coupled between the first local ground terminal and the ground terminal of the substrate, the bias circuit being configured to supply a bias voltage to the first local ground terminal.

13. A microcircuit according to claim 12, wherein the bias circuit includes:
a resistor coupled between the first local ground terminal and the ground terminal of the substrate, the resistor being configured to supply the bias voltage to the first local ground terminal.

14. A microcircuit according to claim 12, wherein the bias circuit includes:
a comparator having first and second inputs and an output, the output being coupled to the first local ground terminal and to the second input;
a resistor coupled between the first input of the comparator and the ground terminal of the substrate; and
a current generator coupled between the first power supply terminal and the first input of the comparator.

15. A microcircuit, comprising:
a first data processing circuit that includes a first power supply terminal and a first local ground terminal, the first local ground terminal being positioned in a first well of a substrate, the first well being electrically isolated from a main part of the substrate by a second well of the substrate and a first embedded region of the substrate;
a first detection circuit formed in the substrate, the first detection circuit being configured to activate a first detection signal in response to detecting that a voltage of at least one of the first local ground terminal and the first power supply terminal of the first data processing circuit crosses a first threshold voltage;
a second data processing circuit that includes a second power supply terminal and a second local ground terminal, the second local ground terminal being formed in a third well of the substrate, the third well being electrically isolated from the main part of the substrate by a fourth well of the substrate and a second embedded region of the substrate; and
a second detection circuit formed in the substrate, the second detection circuit being configured to activate a second detection signal in response to a voltage of at least one of the second local ground terminal and the second power supply terminal crosses a second threshold voltage.

16. A microcircuit according to claim 15, further comprising a logic circuit configured to receive the first and second detection signals and supply an active consolidated detection signal if at least one of the first and second detection signals is active.

17. A microcircuit according to claim 15, further comprising:
a first bias circuit configured to supply a first bias voltage to the first local ground terminal; and
a second bias circuit configured to supply a second bias voltage to the second local ground terminal.

18. A microcircuit portable device, comprising:
a support; and
a microcircuit carried by the support and including:
a first data processing circuit that includes a first power supply terminal and a first local ground terminal, the first local ground terminal being positioned in a first well of a substrate, the first well being electrically isolated from a main part of the substrate by a second well of the substrate and a first embedded region of the substrate;
a first detection circuit formed in the substrate, the first detection circuit being configured to activate a detection signal in response to detecting that a voltage of at least one of the first local ground terminal and the first power supply terminal of the first data processing circuit crosses a first threshold voltage;
a ground terminal of the substrate coupled to the first local ground terminal of the first data processing circuit; and
a bias circuit coupled between the first local ground terminal and the ground terminal of the substrate, the bias circuit being configured to supply a bias voltage to the first local ground terminal.

19. A microcircuit portable device according to claim 18, wherein the bias circuit includes:

a resistor coupled between the first local ground terminal and the ground terminal of the substrate, the resistor being configured to supply the bias voltage to the first local ground terminal.

20. A microcircuit portable device according to claim 18, wherein the bias circuit includes:
a comparator having first and second inputs and an output, the output being coupled to the first local ground terminal and to the second input;
a resistor coupled between the first input of the comparator and the ground terminal of the substrate; and
a current generator coupled between the first power supply terminal and the first input of the comparator.

21. A microcircuit portable device, comprising:
a support; and
a microcircuit carried by the support and including:
a first data processing circuit that includes a first power supply terminal and a first local ground terminal, the first local ground terminal being positioned in a first well of a substrate, the first well being electrically isolated from a main part of the substrate by a second well of the substrate and a first embedded region of the substrate;
a first detection circuit formed in the substrate, the first detection circuit being configured to activate a first detection signal in response to detecting that a voltage of at least one of the first local ground terminal and the first power supply terminal of the first data processing circuit crosses a first threshold voltage;
a second data processing circuit that includes a second power supply terminal and a second local ground terminal, the second local ground terminal being formed in a third well of the substrate, the third well being electrically isolated from the main part of the substrate by a fourth well of the substrate and a second embedded region of the substrate; and
a second detection circuit formed in the substrate, the second detection circuit being configured to activate a second detection signal in response to a voltage of at least one of the second local ground terminal and the second power supply terminal crosses a second threshold voltage.

22. A microcircuit portable device according to claim 21, wherein the microcircuit further includes a logic circuit configured to receive the first and second detection signals and supply an active consolidated detection signal if at least one of the first and second detection signals is active.

23. A microcircuit portable device according to claim 21, wherein the microcircuit further includes:
a first bias circuit configured to supply a first bias voltage to the first local ground terminal; and
a second bias circuit configured to supply a second bias voltage to the second local ground terminal.

* * * * *